(12) United States Patent
Elder

(10) Patent No.: US 10,283,253 B2
(45) Date of Patent: May 7, 2019

(54) TRANSFORMER SYSTEM AND TRANSFORMER TERMINATION SUPPORT

(71) Applicant: ABB Schweiz AG, Baden (CH)

(72) Inventor: Jake C. Elder, Jefferson City, MO (US)

(*) Notice: Subject to any disclaimer, the term of this patent is extended or adjusted under 35 U.S.C. 154(b) by 426 days.

(21) Appl. No.: 15/248,724

(22) Filed: Aug. 26, 2016

(65) Prior Publication Data
US 2017/0062114 A1 Mar. 2, 2017

Related U.S. Application Data

(60) Provisional application No. 62/211,763, filed on Aug. 29, 2015.

(51) Int. Cl.
| | |
|---|---|
| *H01F 27/10* | (2006.01) |
| *H01F 27/02* | (2006.01) |
| *H01F 27/29* | (2006.01) |
| *F16B 5/02* | (2006.01) |

(52) U.S. Cl.
CPC .............. *H01F 27/02* (2013.01); *F16B 5/02* (2013.01); *H01F 27/29* (2013.01)

(58) Field of Classification Search
CPC .................................. H01F 27/02; F16B 5/02
USPC ...................... 336/57, 58; 379/398
See application file for complete search history.

(56) References Cited

U.S. PATENT DOCUMENTS

| | | | | |
|---|---|---|---|---|
| 3,599,134 A * | 8/1971 | Galloway | ............... | H01F 27/02 174/50 |
| 4,434,335 A | 2/1984 | Natsui et al. | | |
| 4,533,786 A * | 8/1985 | Borgmeyer | ............. | H01F 27/02 174/50 |
| 5,783,775 A * | 7/1998 | Marusinec | ............. | H01F 27/06 174/50 |
| 5,828,026 A | 10/1998 | Bruhl et al. | | |
| 7,893,379 B2 | 2/2011 | Schoenemann et al. | | |
| 8,581,097 B2 * | 11/2013 | Ward | ....................... | H01F 27/02 174/50 |
| 8,884,732 B2 * | 11/2014 | Johnson | ................... | A62C 3/16 336/55 |
| 8,928,443 B2 * | 1/2015 | Hyde | .................. | H01F 27/2876 336/57 |
| 2004/0051615 A1 * | 3/2004 | Hafskjold | ........... | E21B 33/0385 336/57 |

(Continued)

FOREIGN PATENT DOCUMENTS

| | | |
|---|---|---|
| CN | 200820150430.1 | 5/2009 |
| EP | 2455957 B1 | 3/2014 |

*Primary Examiner* — Ronald Hinson
(74) *Attorney, Agent, or Firm* — Taft Stettinius & Hollister LLP; J. Bruce Schelkopf

(57) ABSTRACT

A transformer system includes a termination constructed to mechanically couple to a customer electrical line and to electrically couple the transformer to the customer electrical line. A termination support may be coupled to the termination. The termination support may include a body having first wall and a second wall disposed perpendicular to the first wall, and an opening in the first wall and/or the second wall. A fastener may be disposed in the opening(s). The fastener may be constructed to clamp the termination support to the termination. The termination support may be constructed to provide mechanical support to the termination against the weight of the customer electrical line.

20 Claims, 3 Drawing Sheets

(56) References Cited

U.S. PATENT DOCUMENTS

2008/0164966 A1* 7/2008 Findeisen .............. H01F 27/12
　　　　　　　　　　　　　　　　　　　　　　336/57

* cited by examiner

TRANSFORMER SYSTEM AND TRANSFORMER TERMINATION SUPPORT

FIELD OF THE APPLICATION

The present application relates to transformers, and more particularly to a termination support for a transformer termination.

BACKGROUND

Transformers and transformer termination supports remain an area of interest. Some existing systems have various shortcomings, drawbacks and disadvantages relative to certain applications. For example, in some transformer systems, the termination supports may require an undesirable number of components and/or amount of assembly time. Accordingly, there remains a need for further contributions in this area of technology.

SUMMARY

Embodiments of the present invention include a unique transformer system. The transformer system includes a termination constructed to mechanically couple to a customer electrical line and to electrically couple the transformer to the customer electrical line. A termination support may be coupled to the termination. The termination support may include a body having first wall and a second wall disposed perpendicular to the first wall, and an opening in the first wall and/or the second wall. A fastener may be disposed in the opening(s). The fastener may be constructed to clamp the termination support to the termination. The termination support may be constructed to provide mechanical support to the termination against the weight of the customer electrical line.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1A:
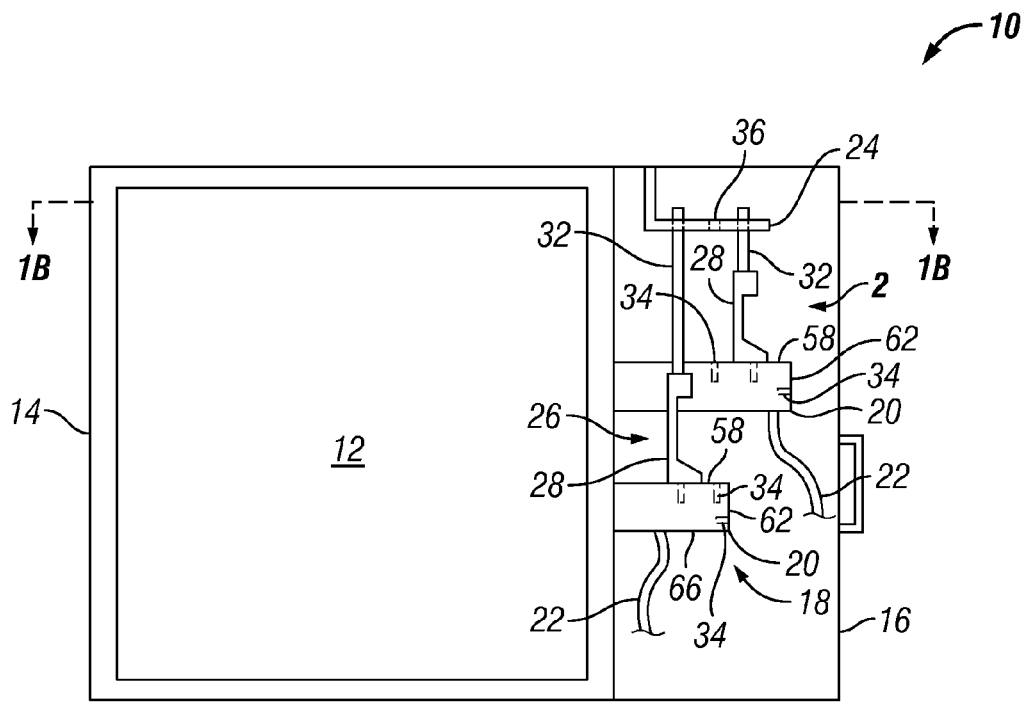
FIGS. 1A and 1B schematically depict some aspects of a transformer system in accordance with a non-limiting example of an embodiment of the present invention.

For purposes of promoting an understanding of the principles of the Transformer System and Transformer Termination Support, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1B:
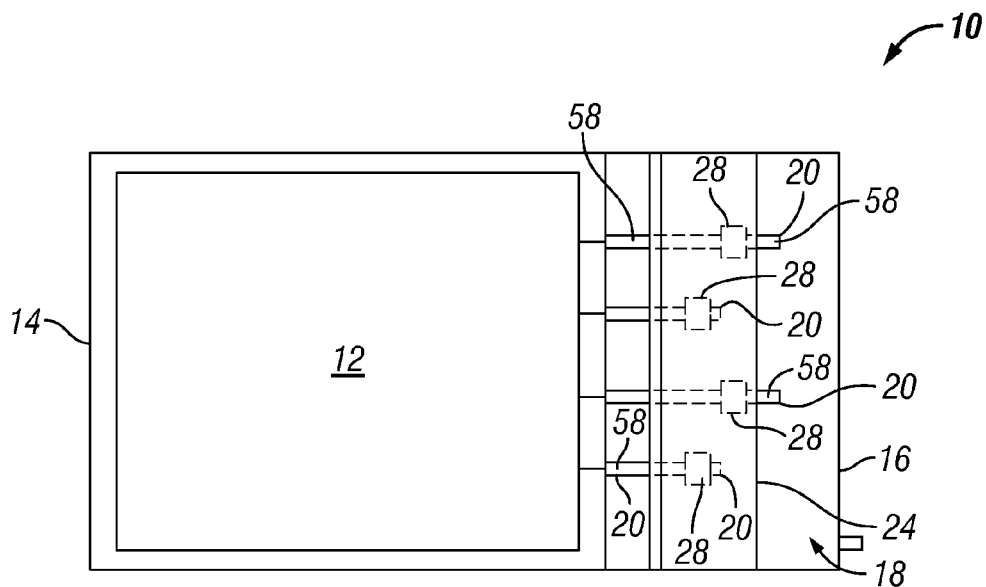
Figure 2:
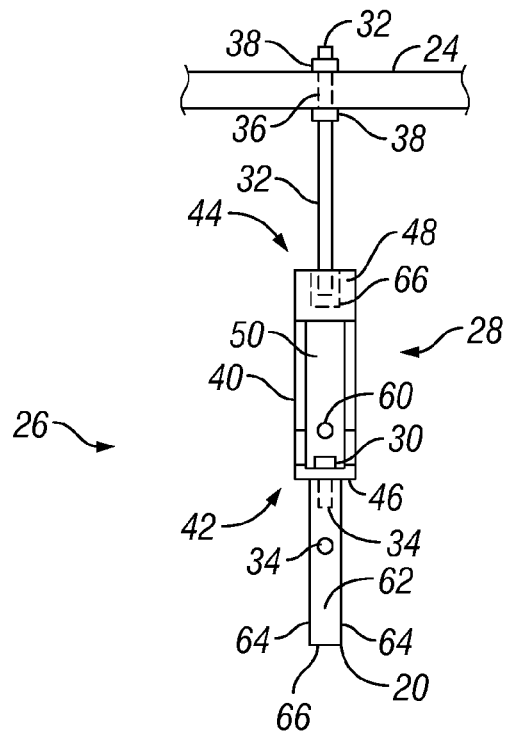
FIG. 2 schematically depicts some aspects of a termination and a termination support in accordance with a non-limiting example of an embodiment of the present invention.
Figure 3A:
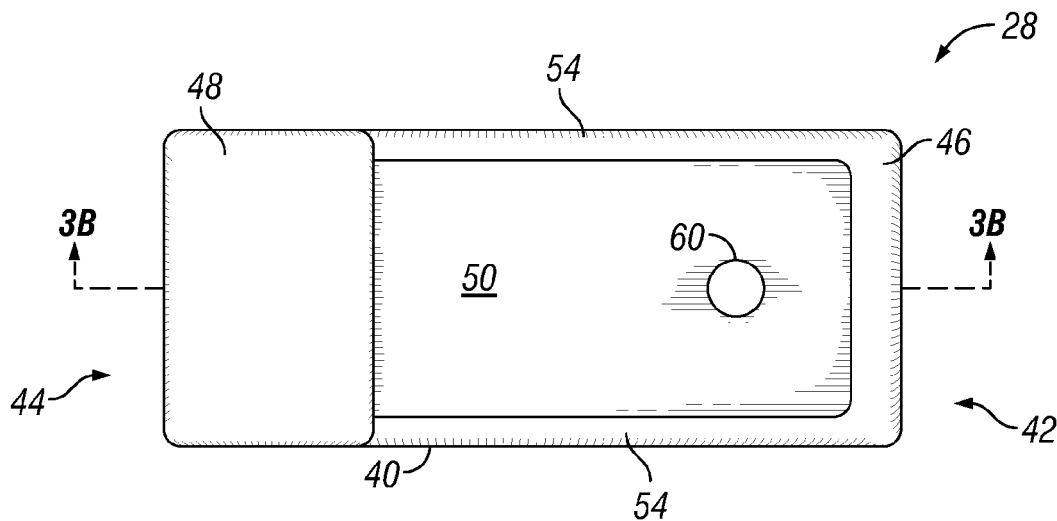
FIGS. 3A, 3B and 3C schematically depict some aspects of a termination support in accordance with a non-limiting example of an embodiment of the present invention.
Figure 3B:
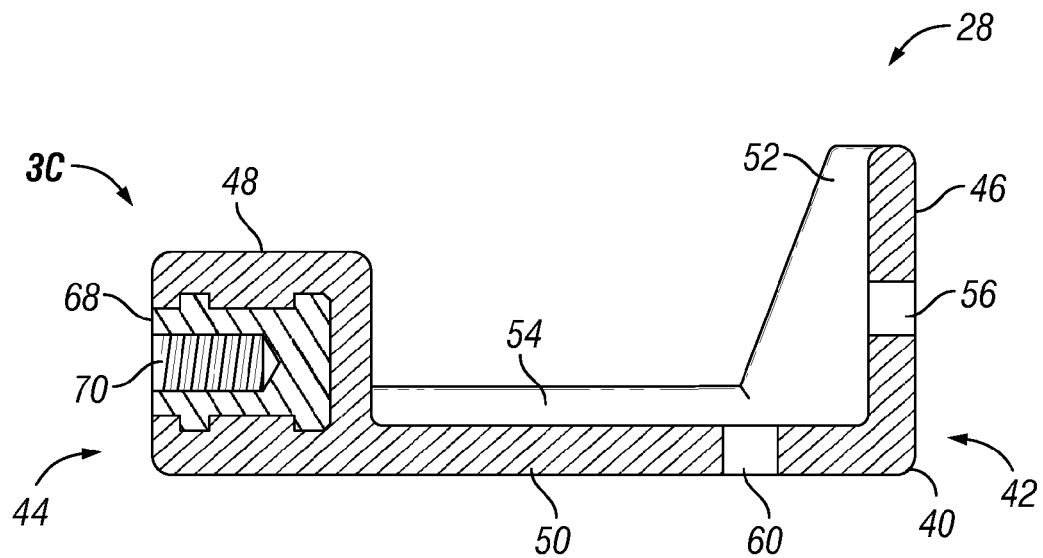
Figure 3C:
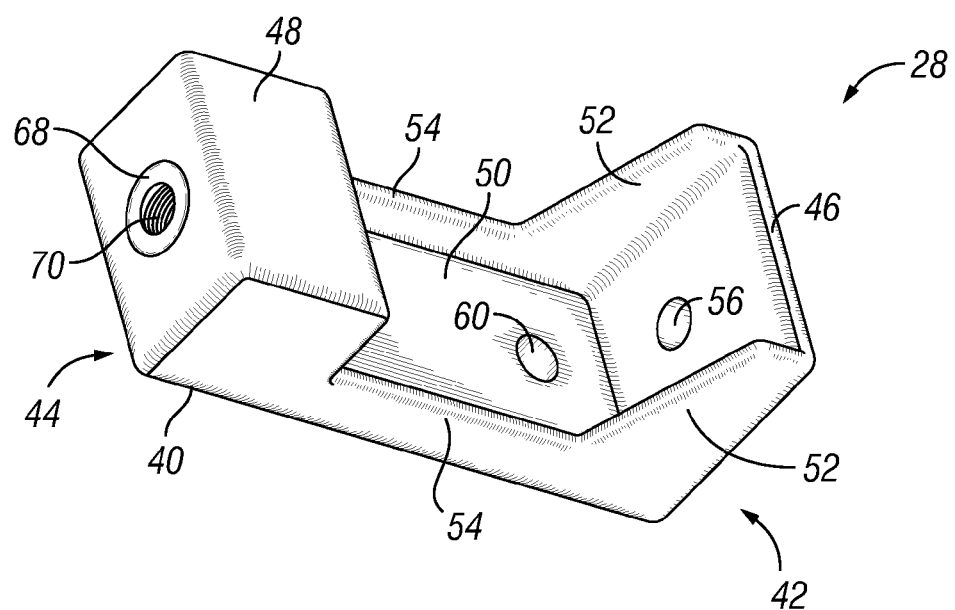

Referring to FIGS. 1A and 1B, some aspects of a transformer system 10 in accordance with a non-limiting example of an embodiment of the present invention are schematically depicted. In one form, transformer system 10 is a 3-phase pad mount transformer system. In other embodiments, transformer system 10 may be any single or multiple phase transformer system. Transformer system 10 includes a transformer 12, a tank 14, a cabinet 16 and a termination system 18 disposed within cabinet 16. In one form, transformer 12 is an oil filled transformer disposed in an oil bath in an oil tank 14. In other embodiments, transformer 12 may be a dry-type transformer or another type of transformer disposed in a housing or cabinet. Cabinet 16 is attached to tank 14, and encloses termination system 18.

Termination system 18 includes a plurality of terminations 20 extending from tank 14 into cabinet 16, e.g., one termination for each phase of a 3-phase transformer 12, and one for neutral. Each termination is electrically coupled to transformer 12. In one form, terminations 20 are low voltage (LV) terminations, and each phase termination 20 is coupled to an LV coil on transformer 12. In other embodiments, each phase termination 20 may be coupled to other coils. Neutral termination 20 is coupled to a suitable electrically neutral pole. In various embodiments, the voltage associated with each termination may vary with the needs of the application. In one form, terminations 20 are spades. In other embodiments, one or more of terminations 20 may take other forms.

Each termination 20 is constructed to mechanically couple to one or more customer electrical lines 22, e.g., electrical cables, and to thereby electrically couple transformer 12 to customer electrical line(s) 22. In some installations, the weight of the customer electrical line(s) 22 may be high enough that it is desirable to provide mechanical support to terminations 20 against the weight of customer electrical lines(s) 22. Accordingly, cabinet 16 includes a bracket 24 and a support system 26 disposed within cabinet 16 for supporting terminations 20. Support system 26 is attached to bracket 24 and to each termination 20.

Referring to FIGS. 2 and 3A-3C, support system 26 includes, for each termination 20, a termination support 28, a fastener 30 and a fastener 32. Termination support 28 is constructed to provide mechanical support to termination 20 against the weight of customer electrical line(s) 22 coupled to termination 20. In one form, each termination 20 includes a plurality of openings 34, e.g., located at different positions on termination 20. In other embodiments, one or more terminations 20 may include only a single opening 34. Openings 34 are operative to receive fasteners 30 of the same size or different sizes. In one form, openings 34 are constructed to engage fastener 30. For example, in some embodiments, fastener 30 is a threaded fastener, such as a screw or a bolt, and openings 34 are threaded openings constructed to threadingly engage the threads of fastener 30.

Bracket 24 includes a plurality of threaded openings 36, e.g., located at different positions on bracket 24 in relative alignment to openings 34 and/or other features of terminations 20. In other embodiments, bracket 24 may include only a single opening 36. Each opening 36 is operative to receive fastener 32. In one form, openings 36 are holes constructed to receive a threaded fastener 32, which is secured to bracket 24 via two nut and washer sets 38. In other embodiments, openings 36 may be threaded openings constructed to engage corresponding threads on a threaded fastener 32. In still other embodiments, fastener 32 may be secured to bracket 24 via other means. In some embodiments, fastener 32 may be a stud extending from bracket 24 and received into and engaged with termination support 28, e.g., using a bayonet clamp feature or other attachment feature. In other embodiments, fastener 32 may be a stud or other protuberance extending from termination support 28 and received into and engaged with bracket 24 or attached to bracket 24. In still other embodiments, fastener 32 may be any freestanding fastener or any protuberance, threaded or otherwise, extending from termination support 28 and/or bracket 24 that is suitable for attaching termination support 28 to bracket 24/cabinet 16 and for transmitting the load associated with customer electrical line(s) 22 from termination support 28 to bracket 24/cabinet 16. In various embodiments, fastener 32 may be additionally or alternatively secured to another portion or feature of cabinet 16 and/or of tank 14.

Termination support 28 is constructed to provide mechanical support to termination 20 against the weight of the customer electrical line(s) 22 by transmitting the load associated with customer electrical line(s) 22 to another structure, e.g., bracket 24 of cabinet 16 in the illustrated embodiment. In other embodiments, termination support 28 may transmit the mechanical load to other structures in addition to or in place of bracket 24. Termination support 28 is coupled to termination 20 via fastener 30, and to bracket 24 via fastener 32.

Termination support 28 includes a body 40. In one form, body 40 is nonconductive, e.g., formed of a nonmetallic insulating material. An example of a suitable material for body 40 is a glass poly (polyester glass), such as a GP-03 glass mat reinforced low pressure molded polyester, available from the Gund Company of St. Louis, Mo., USA, or a similar material. However, the present application contemplates other materials than the material disclosed herein provided it has the desired characteristics. Body 40 has a first end 42 and a second end 44 disposed opposite first end 42. Body 40 includes a wall 46 positioned at first end 42, a boss 48 positioned at second end 44, and a wall 50 extending between first end 42 and second end 44. In one form, wall 46, boss 48 and wall 50 are integral. In other embodiments, one or more of wall 46, boss 48 and wall 50 may be separate components assembled and joined together.

Body 40, wall 46, boss 48 and wall 50 are mechanically constructed to support the weight of customer electrical line(s) 22. In one form, wall 50 is perpendicular to wall 46. In other embodiments, wall 50 may be disposed in another orientation relative to wall 46. In one form, body 40/wall 56 includes two gussets 52 constructed to buttress wall 46. In other embodiments, wall 46 may be buttressed by any number of gussets 52 or may not be buttressed by any gussets. In one form, wall 50 is reinforced by two ribs 54. In other embodiments, wall 50 may be reinforced by any number of ribs or may not be reinforced by any ribs.

Wall 46 has an opening 56 disposed therein. Opening 56 is constructed to receive fastener 30, e.g., a bolt or a screw. Fastener 30 is disposed in opening 56 and extends into termination 20, e.g., is screwed into a threaded opening 56 in termination 20. In one form, fastener 30 clamps termination support 28 to a top surface 58 of termination 20. In other embodiments, fastener 30 may clamp termination support 28 to another surface. In some embodiments, fastener 30 may be a stud that extends outward from termination 20 into opening 56, e.g., wherein a nut and washer set 38 or other attachment feature are used to engage fastener 30 and clamp termination support 28 to termination 20. In other embodiments, fastener 30 may be any free-standing fastener or any protuberance, threaded or otherwise, extending from termination 20 that is suitable for attaching termination support 28 to termination 20 and for transmitting load associated with customer electrical line(s) 22 from termination 20 to termination support 28. Wall 46 is constructed to transmit the load associated with the weight of customer electrical line(s) 22 from termination 20 to wall 50.

Wall 50 includes an opening 60 that is constructed to receive fastener 30, which may be engaged with an opening 34 in a front face 62 of termination 20, in like manner as wall 46 and opening 56, in order to clamp termination support 28 to termination 20. That is, in some embodiments, either opening 56 or opening 60 or both may be selected for receiving a fastener 30 and clamping or otherwise attaching or coupling termination support 28 to termination 20. In various embodiments, openings 56 or 60 may be used for clamping respective walls 46 or 50 of termination support 28 to a side face 64 or other suitable surface of termination 20. In some embodiments, one or both of openings 56 and 60 may be employed or selected to attach termination support 28 to a respective bottom surface 66 (e.g., having an opening 34 therein) and/or front face 62 and/or side face 64 of termination 20, respectively, e.g., wherein front face 62 or side face 64 is disposed between wall 46 and boss 48 in the installed condition. Wall 50 is constructed to transmit the loads associated with the weight of customer electrical line(s) 22 from wall 46 to boss 48.

Disposed within boss 48 is an insert 68. In one form, insert 68 is a threaded insert, i.e., an insert having a threaded opening 70 constructed to receive and engage fastener 32 for securing termination support 28 to bracket 24. In other embodiments, insert 68 may be another type of insert having another form of opening 70 constructed to receive and engage fastener 32. In still other embodiments, other means may be employed for engaging fastener 32 with boss 48 for securing termination support 28 to bracket 24. Insert 68 is affixed to boss 48 of body 40. In one form, insert 68 is "insert molded" into boss 48, i.e., wherein boss 48 is molded or otherwise formed around and encompasses insert 68. In other embodiments, insert 68 may be affixed to boss 48 via other means. Boss 48 and insert 68 are constructed to transmit the loads associated with the weight of customer electrical line(s) 22 from wall 50 to fastener 32, and hence into bracket 24 and cabinet 16.

The illustrated embodiment may be assembled by threading fastener 32 into opening 70 of insert 68 in boss 48. A nut and washer set 38 is then threaded onto fastener 32 to a sufficient degree to allow termination support 28 to be aligned in the desired location adjacent to or on top of termination 20. Termination support 28 is then positioned to align opening 56 (in wall 46) and/or opening 60 (in wall 50) with a desired opening or openings 34 in termination 20 (in one or more of front face 62, side face 64 and bottom surface 66). A fastener 30 is then inserted into opening 56 and/or opening 60, and threaded into corresponding openings 34 of termination 20. The fastener(s) 30 is tightened to an appropriate torque value to clamp termination support 28 to termination 20. A second nut and washer set 38 is then threaded onto fastener 32 from above bracket 24, and subsequently, both of nut and washer sets 38 are positioned at desired locations and tightened to an appropriate torque value. Other assembly sequences may be employed.

Embodiments of the present invention include a transformer system, comprising: a transformer; a termination electrically coupled to the transformer, the termination being constructed to mechanically couple to a customer electrical line and to electrically couple the transformer to the customer electrical line; a termination support coupled to the termination; the termination support including a body having a first wall and a second wall disposed perpendicular to the first wall, the termination support including an opening in the first wall and/or the second wall; and a first fastener disposed in the opening, and constructed to clamp the termination support to the termination, wherein the termination support is constructed to provide mechanical support to the termination against the weight of the customer electrical line.

In a refinement, the body has a first end and a second end opposite the first end; wherein the first wall is disposed at the first end; and wherein the termination support includes another opening disposed at the second end, the transformer system further comprising a cabinet and a second fastener constructed to secure the termination support to the cabinet using the other opening.

In another refinement, the transformer system further comprises a threaded insert disposed in the body at the second end; wherein the other opening is a threaded opening in the threaded insert; and wherein the second fastener is a threaded fastener constructed for threading engagement with the threaded insert.

In yet another refinement, the body further includes a gusset constructed to buttress the first wall.

In still another refinement, the second wall includes a rib constructed to reinforce the second wall.

In yet still another refinement, the body has a first end and a second end opposite the first end, wherein the first wall is positioned at the first end.

In a further refinement, the second wall extends between the first end and the second end.

Embodiments of the present invention include a transformer system, comprising: a transformer oil tank; a transformer disposed within the oil tank; a cabinet coupled to the oil tank; a termination disposed in the cabinet and electrically coupled to the transformer, the termination being constructed to mechanically couple to a customer electrical line and to electrically couple the transformer to the customer electrical line; a termination support coupled to the cabinet and/or the tank and to the termination; the termination support including a nonconductive body having first wall and a second wall disposed perpendicular to the first wall, the termination support including a first opening in the first wall and a second opening in the second wall; and a first fastener disposed in a selected one or both of the first and second openings, wherein the first fastener is constructed to clamp the termination support to the termination, wherein the termination support is coupled to the cabinet and/or the oil tank and constructed to provide mechanical support to the termination against the weight of the customer electrical line.

In a refinement, the termination is a spade.

In another refinement, the body has a first end and a second end opposite the first end, wherein the first wall is positioned at the first end.

In yet another refinement, the second wall extends between the first end and the second end.

In still another refinement, the termination support includes a third opening at the second end.

In yet still another refinement, the transformer system further comprises a threaded insert disposed within the body, wherein the third opening is a threaded opening in the threaded insert.

In a further refinement, the transformer system further comprises a second fastener constructed to secure the termination support to the cabinet using the third opening.

In a yet further refinement, the cabinet includes a bracket, and a second fastener constructed to secure the termination support to the bracket using the third opening.

In a still further refinement, the body further includes a gusset constructed to buttress the first wall.

Embodiments of the present invention include a termination support for supporting a transformer termination against the weight of a customer electrical line coupled to the termination, comprising: a nonconductive body having a first end and a second end; a first wall of the body positioned at the first end, the first wall having a first opening therein, wherein the first opening is constructed to receive a fastener, and wherein first wall is mechanically constructed to support the weight of the customer electrical line; a boss of the body positioned at the second end, the termination support having a second opening disposed in the boss, wherein the second opening is constructed to receive a fastener, and wherein the boss is mechanically constructed to support the weight of the customer electrical line; and a second wall of the body disposed between the first end and the second end and extending between the first wall and the boss; wherein the second wall is perpendicular to the first wall; and wherein the second wall is mechanically constructed to support the weight of the customer electrical line, wherein the first wall, the second wall and the boss are integral.

In a refinement, the body includes a gusset operative to buttress the first wall.

In another refinement, the termination support further comprises a threaded insert disposed in the boss, wherein the second opening is a threaded opening in the insert.

In a further refinement, the second wall includes a third opening, the third opening is constructed to receive a fastener, and the second wall is mechanically constructed to support the weight of the customer electrical line.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A transformer system, comprising:
   a transformer;
   a termination electrically coupled to the transformer, the termination being constructed to mechanically couple to a customer electrical line and to electrically couple the transformer to the customer electrical line;
   a termination support coupled to the termination; the termination support including a body having a first wall and a second wall disposed perpendicular to the first wall, the termination support including an opening in the first wall and/or the second wall; and a first fastener disposed in the opening, and constructed to clamp the termination support to the termination, wherein the termination support is constructed to provide mechanical support to the termination against the weight of the customer electrical line.

2. The transformer system of claim 1, the body further including a gusset constructed to buttress the first wall.

3. The transformer system of claim 1, the second wall including a rib constructed to reinforce the second wall.

4. The transformer system of claim 1, the body having a first end and a second end opposite the first end, wherein the first wall is disposed at the first end; and wherein the termination support includes an other opening disposed at the second end, further comprising a cabinet and a second fastener constructed to secure the termination support to the cabinet using the other opening.

5. The transformer system of claim 4, further comprising a threaded insert disposed in the body at the second end, wherein the other opening is a threaded opening in the threaded insert; and wherein the second fastener is a threaded fastener constructed for threading engagement with the threaded insert.

6. The transformer system of claim 1, the body having a first end and a second end opposite the first end, wherein the first wall is positioned at the first end.

7. The transformer system of claim 6, wherein the second wall extends between the first end and the second end.

8. A transformer system, comprising:
a transformer oil tank;
a transformer disposed within the oil tank;
a cabinet coupled to the oil tank;
a termination disposed in the cabinet and electrically coupled to the transformer, the termination being constructed to mechanically couple to a customer electrical line and to electrically couple the transformer to the customer electrical line;
a termination support coupled to the cabinet or the tank and to the termination;
the termination support including a nonconductive body having first wall and a second wall disposed perpendicular to the first wall, the termination support including a first opening in the first wall and a second opening in the second wall; and
a first fastener disposed in a selected one or both of the first and second openings, wherein the first fastener is constructed to clamp the termination support to the termination,
wherein the termination support is coupled to the cabinet and/or the oil tank and constructed to provide mechanical support to the termination against the weight of the customer electrical line.

9. The transformer system of claim 8, wherein the termination is a spade.

10. The transformer system of claim 8, the body further including a gusset constructed to buttress the first wall.

11. The transformer system of claim 8, the body having a first end and a second end opposite the first end, wherein the first wall is positioned at the first end.

12. The transformer system of claim 11, wherein the second wall extends between the first end and the second end.

13. The transformer system of claim 11, wherein the termination support includes a third opening at the second end.

14. The transformer system of claim 13, further comprising a threaded insert disposed within the body, wherein the third opening is a threaded opening in the threaded insert.

15. The transformer system of claim 13 further comprising a second fastener constructed to secure the termination support to the cabinet or the tank using the third opening.

16. The transformer system of claim 13, wherein the cabinet includes a bracket, further comprising a second fastener constructed to secure the termination support to the bracket using the third opening.

17. A termination support for supporting a transformer termination against the weight of a customer electrical line coupled to the termination, comprising:
a nonconductive body having a first end and a second end;
a first wall of the body positioned at the first end, the first wall having a first opening therein, wherein the first opening is constructed to receive a fastener; and
wherein first wall is mechanically constructed to support the weight of the customer electrical line;
a boss of the body positioned at the second end, the termination support having a second opening disposed in the boss, wherein the second opening is constructed to receive a fastener, and wherein the boss is mechanically constructed to support the weight of the customer electrical line; and
a second wall of the body disposed between the first end and the second end and extending between the first wall and the boss; wherein the second wall is perpendicular to the first wall; and wherein the second wall is mechanically constructed to support the weight of the customer electrical line,
wherein the first wall, the second wall and the boss are integral.

18. The termination support of claim 17, wherein the body includes a gusset operative to buttress the first wall.

19. The termination support of claim 17, further comprising a threaded insert disposed in the boss, wherein the second opening is a threaded opening in the insert.

20. The termination support of claim 17, wherein the second wall includes a third opening; wherein the third opening is constructed to receive a fastener; and wherein the second wall is mechanically constructed to support the weight of a customer electrical line coupled to the termination.

* * * * *